March 27, 1956  F. A. KANE, JR  2,739,373
PIPE COUPLING TOOL

Filed May 10, 1951  4 Sheets-Sheet 1

INVENTOR.
FRANK A. KANE JR.
BY
ATTORNEY

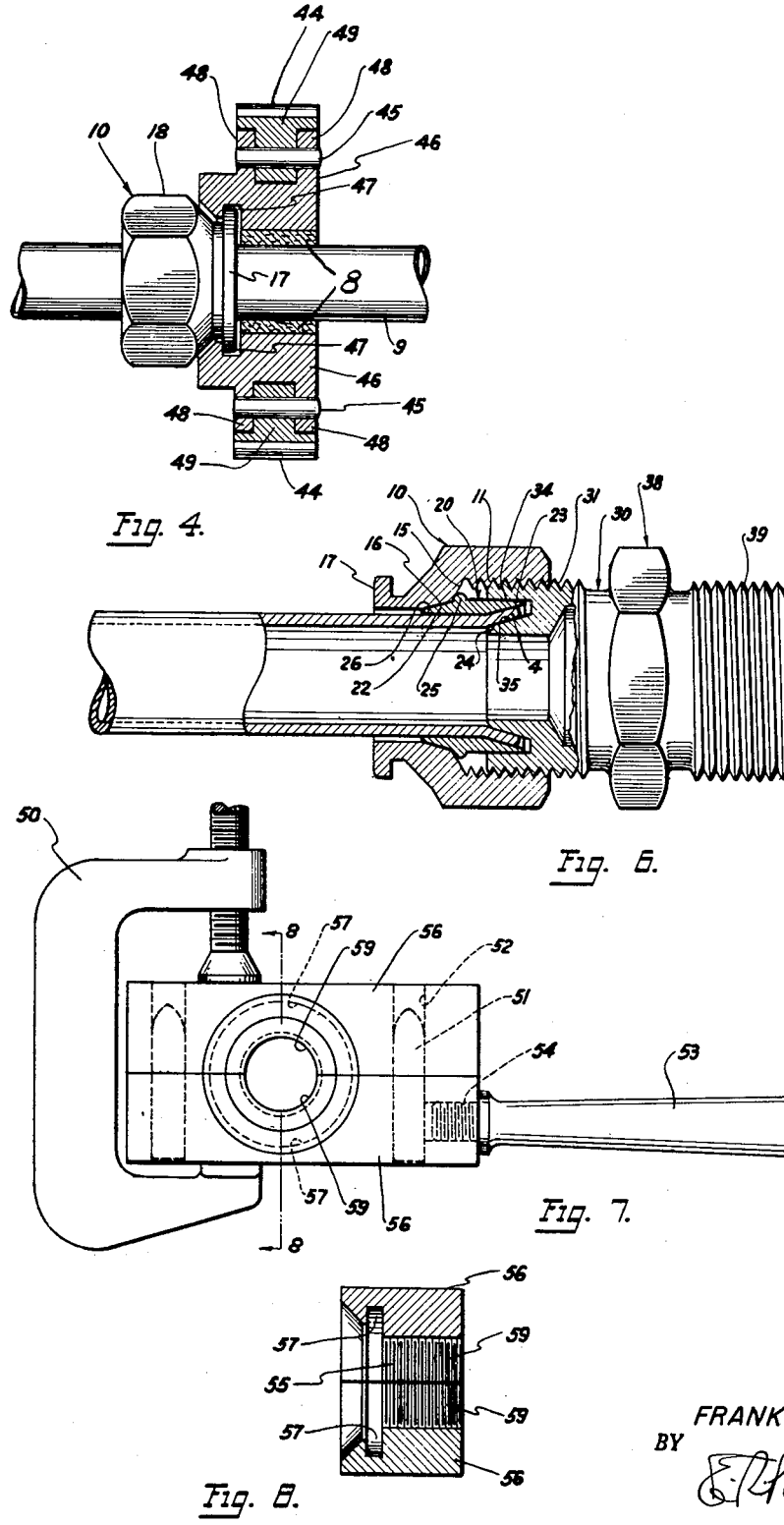

March 27, 1956     F. A. KANE, JR     2,739,373
PIPE COUPLING TOOL
Filed May 10, 1951     4 Sheets-Sheet 3
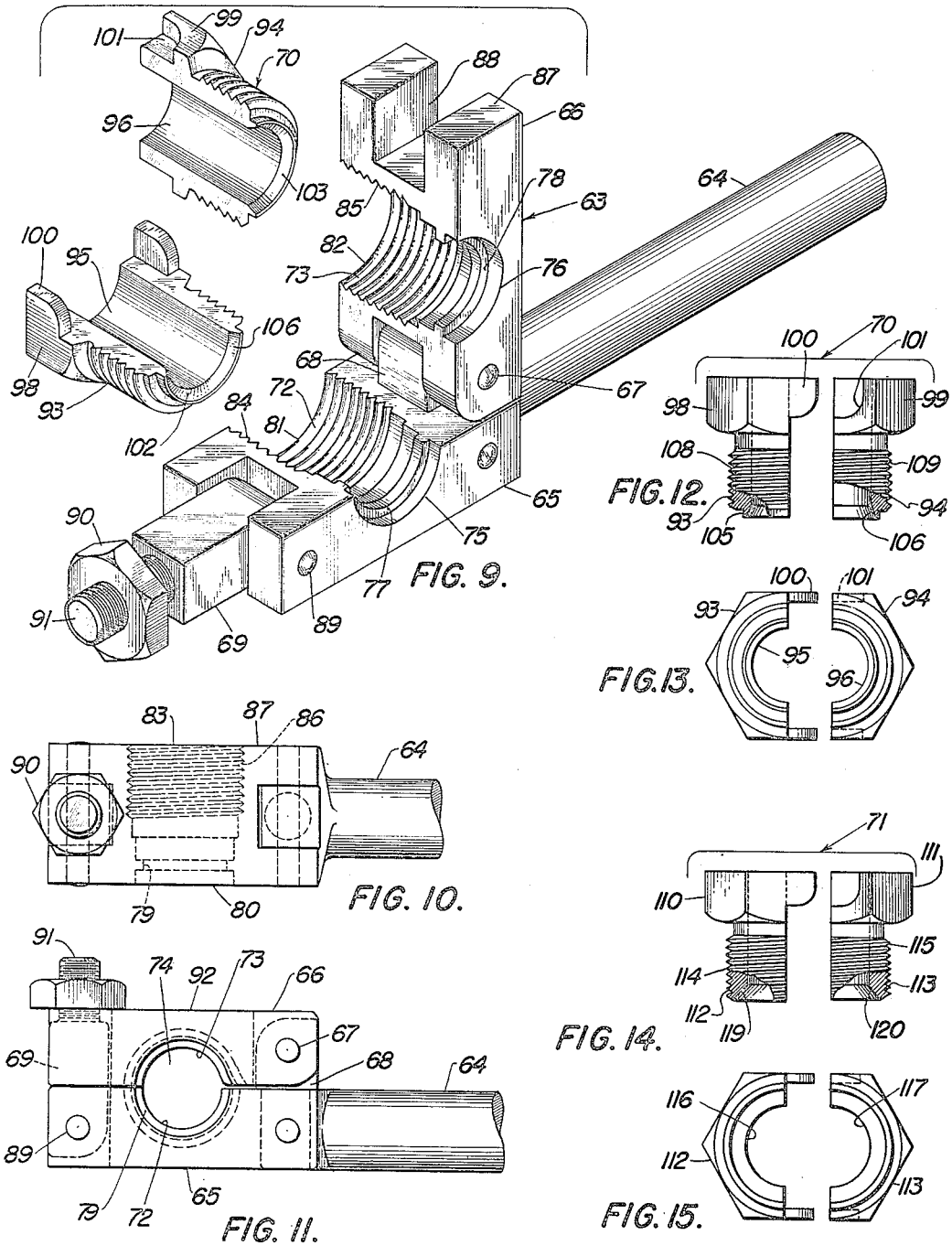
INVENTOR
FRANK A. KANE JR.
BY
ATTORNEY March 27, 1956   F. A. KANE, JR   2,739,373
PIPE COUPLING TOOL
Filed May 10, 1951   4 Sheets-Sheet 4
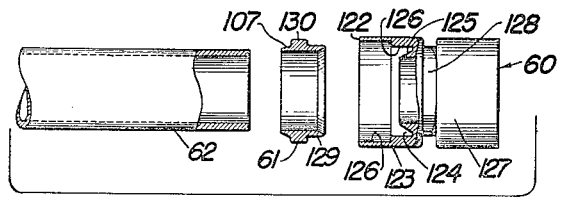
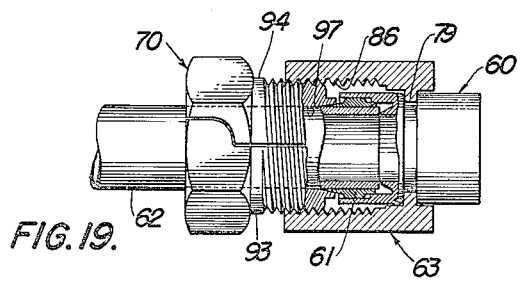
FIG.16.
FIG.19.
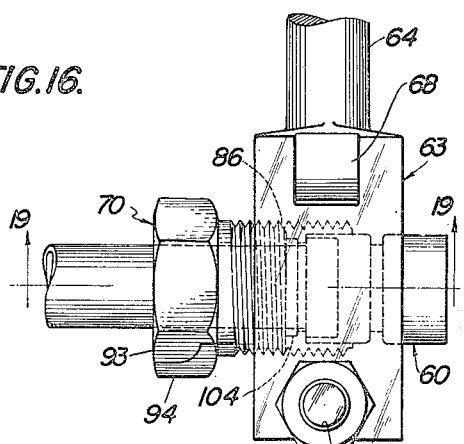
FIG. 18.
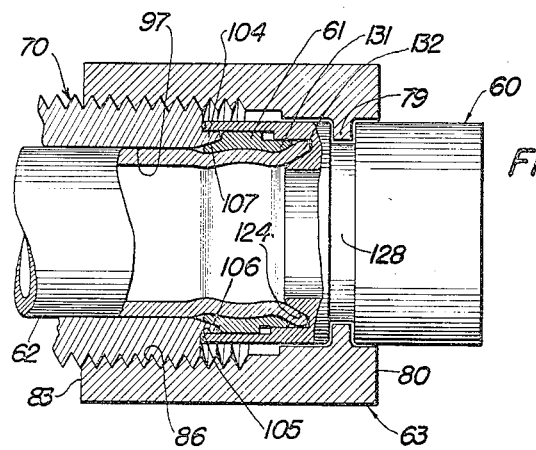
FIG. 20.
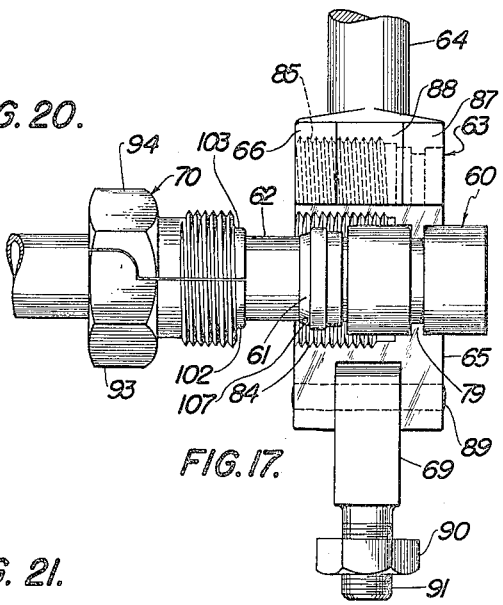
FIG. 17.
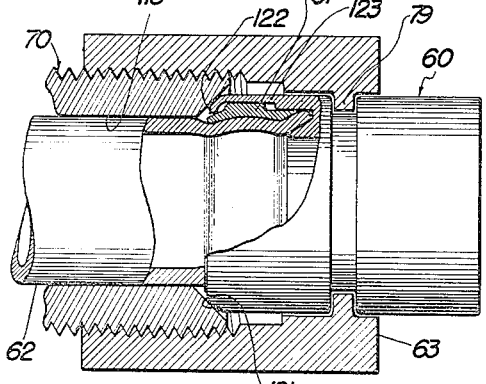
FIG. 21.
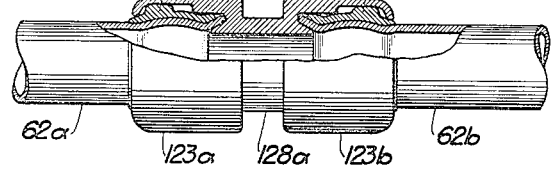
FIG.22.
INVENTOR
FRANK A. KANE JR.
BY
ATTORNEY United States Patent Office 2,739,373
Patented Mar. 27, 1956

2,739,373

PIPE COUPLING TOOL

Frank A. Kane, Jr., Stratford, Conn.

Application May 10, 1951, Serial No. 225,499

1 Claim. (Cl. 29—237)

This invention relates to pipe couplings and a tool and method of effecting a pipe connection. This is a division and continuation in part of my prior application filed August 20, 1946, Serial No. 691,729, which matured into Patent No. 2,555,591.

My invention is especially adapted for tubes and pipes of comparatively ductile or malleable material such as aluminum, copper, brass or other deformable metal, it being within the contemplation of this invention to unite a pipe of such material with a coupling device having a sleeve and a connector member containing an annular recess. In the accomplishment of this objective it is a further important object to effect such a union by a relatively simple and easily manipulatable tool adapted to conjointly force the sleeve and the front end of the pipe forwardly into said annular recess, to effect a pressing engagement of the said front end of the pipe with the sleeve and walls of said recess. And in this aspect of my invention it is also an object to effect a deformation and compression of the portion of the pipe that is in engagement with the sleeve, to thereby enhance the strength and sealing effectiveness of the joint.

It is further within the contemplation of my invention to enable a pipe union as above-described to be effected both with threaded and unthreaded coupling components. And in both of these applications it is an object to provide a securing or forcing member for pushing the sleeve into its assembled position within the coupling member, and releasable clamping means engageable with the said connecting member for holding said means and member against relative axial or longitudinal movement, while permitting the sleeve and pipe to move into pressing operative engagement with the said coupling member.

Another objective of this invention is to provide a coupling tool which will produce a flaring of the front end of the pipe during the coupling operation, thereby eliminating the separate operation heretofore required in pre-flaring. This advantage is of considerable significance where the coupling is to be made in cramped quarters where it would be awkward or difficult to pre-flare the pipe, especially if of large size.

Other objects, features and advantages will appear from the drawings and the description hereinafter given.

Referring to the drawings,

Figure 4 is a section taken on the line 4—4 of Figure 3;

Figure 6, partially in section, shows the component parts of the coupling and the pipe in final, sealed relationship;

Figure 7 is a front view of a modified form of special tool better suited for large size pipe;

Figure 8 is a section of Figure 7 taken along line 8—8;

Figure 9 is a perspective view of another modified form of tool according to my invention, adapted for effecting a joinder of threadless coupling members, the jaws of the tool being shown open, and the separable pusher component being shown removed from the tool;

Figure 10 is a fragmentary plan view of the device of Figure 9 with the jaws closed, but without the pusher member;

Figure 11 is a side view of Figure 10;

Figure 12 is a top view of the split pusher member of Figure 9, shown separated;

Figure 13 is a bottom view of Figure 12;

Figure 14 is a view, corresponding to Figure 12, of the connector curling and sealing component of this invention;

Figure 15 is a bottom view of Figure 14;

Figure 16 is a disassembled part-sectional, part-elevational view of a pipe and a form of threadless coupling device according to my invention adapted to be joined by the tool of Figure 9;

Figure 17 is a plan view of the open tool of Figure 9 with the member of Figure 16 in preliminary assembled relation within the tool, the pusher member being shown over the pipe but out of engagement with the tool;

Figure 18 is a plan view of the parts of Figure 17 with the tool operatively closed, and the pusher member in operative position within the tool;

Figure 19 is a fragmentary section of Figure 18 along line 19—19, parts being shown in elevation, the pipe and the coupling device being in preliminary assembled relation;

Figure 20 is an enlarged fragmentary view like Figure 19, but showing the pusher member in its final operative position, and the pipe and the coupling device in their final assembled position;

Figure 21 is a view like Figure 20, but showing the curling tool of Figures 14 and 15 in final operative position, and with the connector terminal edge in its final curled and sealed condition; and Figure 22 is an elevational view, partly in section, of a threadless connector member joining two pipes, substantially in the manner shown in Figure 21 for a single pipe.

Figure 1:
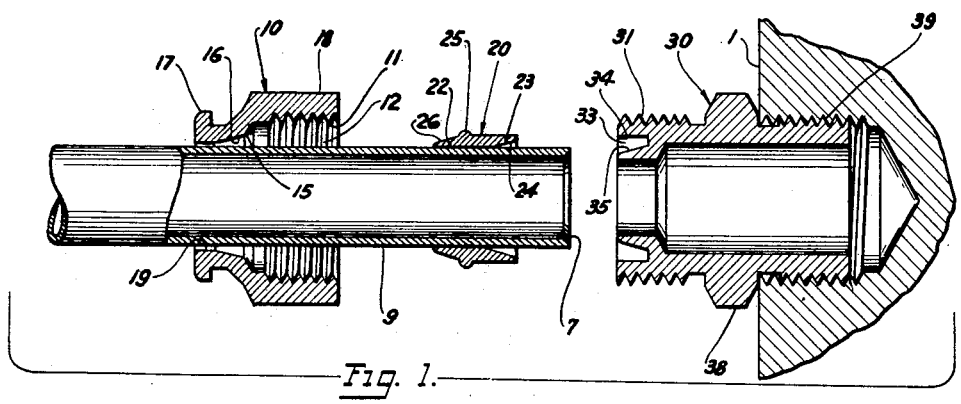
Figure 1 is a sectional view of one form of pipe and coupling device adapted for use with one form of the special tool of my invention, the coupling being of the threaded variety—the component parts being separated but shown in their cooperative relation.

The form of my invention shown in Figures 1 to 8 is adapted for use with the pipe and coupling device of Figure 1, the said device being of the threaded type comprising three component parts, a nut 10 (the pusher or securing member), a sleeve 20 and a connector 30. The end of connector 30 which faces the nut 10 is externally threaded at 31 for engagement with internal threads 11 of the nut. The other end of connector 30 is shown in Figure 1 with external threads 39 for screwing into a surface 1 which may be the wall of a tank, a fitting or the like. So far as the invention is concerned, connector 30 may be integral with surface 1, or it may be provided with internal threads or be connected in any manner with the fitting, pipe or fixture to be coupled. Between its threaded ends, 31, 39, connector 30 may be provided with planar surfaces 38, shown hexagonal in Figure 6, for application of a wrench. Nut 10 is likewise provided with planar surfaces 18, shown hexagonal in Figure 4, for the same purpose. The pipe 9 to be joined to the coupling is inserted through opening 19 of nut 10 and the sleeve 20 slipped on the inserted end of the pipe.

Figure 2:
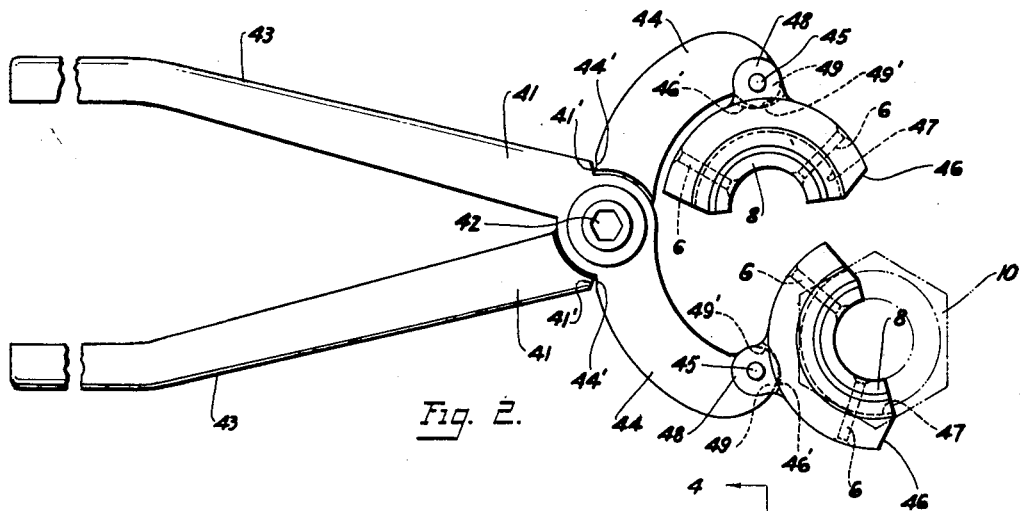
Figure 2 is a front view of the special tool in open position with the lower jaw turned outwardly.

The inserted end of pipe 9 is not pre-flared, the pipe being flared during the operative forming of the coupled joint, as will hereinafter appear. To facilitate the flaring operation, the inserted end of pipe 9 is beveled or chamfered at its end, indicated at 7, by a pipe reamer, tapered scraper or the like. After the component parts of the coupling and the chamfered pipe are assembled as shown in Figure 1, the tool of Figure 2 is applied to the nut 10 and to the pipe 9.

Figures 3, 5:
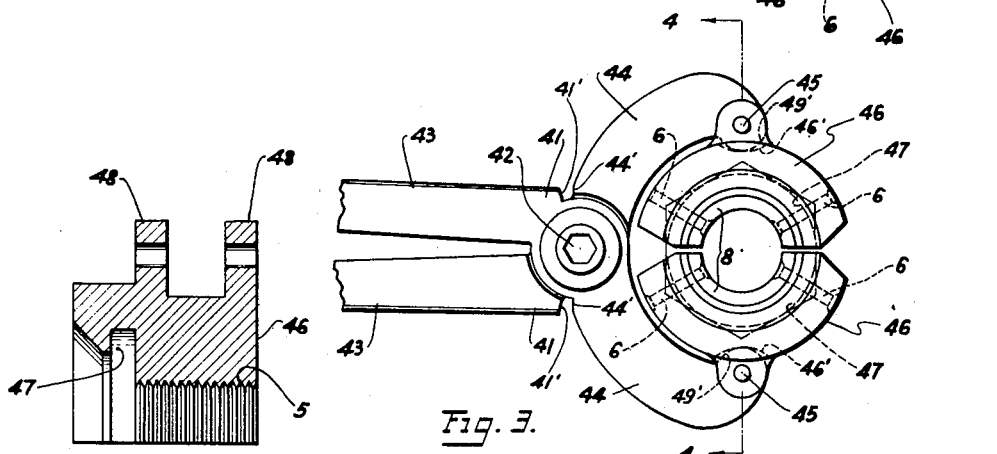
Figure 3 is a front view of the special tool in clamping position.
Figure 5 is a section through the jaw of a modified form of tool.

This tool is formed principally of two symmetrical levers 41, 41 pivoted together at 42, each of the levers having a long shank 43 and a shorter arcuately curved portion 44. At the distal ends of curved portions 44, 44 of the levers are pivotly mounted, at 45, a semi-circular vise or shoe 46. The two semi-circular shoes 46, 46 match together, as shown in Figure 3, to form an annular ring. It was stated above that the tool is applied to both the nut 10 and to the pipe 9. The tool is applied to the nut 10 in a manner to permit the nut to be turned relatively to the tool and to the pipe and at the same time preventing axial or longitudinal movement of the nut relative to the tool. The tool is applied to the pipe 9 in a manner to prevent turning or axial movement of the pipe relative to the tool; in other words, the tool makes clamping arrangement with the pipe.

In order that the nut 10 may be held in the tool for rotational and non-axial movement relative to tool, nut 10 is provided at one end with an annular flange 17 and the shoes 46, 46 of the tool are provided with a semi-circular groove, 47, 47 (see Figure 4). When the shoes 46, 46 are matched as in Figure 3, the semi-circular grooves 47, 47 match to form an annular groove. The grooves 47, 47 are dimensioned relatively to the annular flange 17 of nut 10 (Figure 4), so that the flange will not be confined by the groove, either peripherally or laterally, when the levers of the tool are forced together in closed position (Figure 3). Hence nut 10 can be freely turned relatively to the tool, but has only sufficient axial or longitudinal movement as may be required for lateral clearance of the flange 17 in annular groove 47.

The half shoes 46, 46 are provided with means for clamping the pipe 9, which means are preferably different for different tubing materials. For very soft metal or plastic tubes, the clamping means comprises a pair of semi-circular strips of leather, rubber or similar pliable material 8, 8, which are secured to the respective vises or shoes 46, 46, as by rivets 6. The strips 8, 8 encircle the relatively soft pipe when the tool vises are closed, as in Figure 3, and the shanks 43 of the levers 41, 41 are squeezed together, to exert a frictional grip on the pipe.

In the case of comparatively hard metal pipe, the vise shoes 46 46 would be provided with threads 5 (Figure 5), or other sharp indentations which will be effective to grip into the hard surface of the metal.

In operatively making the coupling joint, the tool is applied to nut 10 in the manner aforesaid. The component parts of the coupling are shown separated in Figure 1, for purposes of clarity; but it is evident that the tool is not applied until the parts are in preliminary assembled relation, i. e., with external threads 31 of connector 30 at the point of entering internal threads 11 of nut 10 or even after the connector and nut are in threaded engagement. In this position of the connector 30 and nut 10, sleeve 20 is interposed between the two with the rear portion (leftward, Figure 1), 22 of the sleeve received in the annular cavity 12 of nut 10 and with its forward end 23 disposed in annular recess 33 at the left transverse end of connector 30. In the said position of the parts, the forward, chamfered end 7 of the pipe is likewise disposed in the annular recess 33 of the connector.

The said annular recess 33 of connector 30 has a cylindrical outer surface 34 and an inner conical surface 35, so that 33 is an annular conical recess. After nut 10 and connector 30 are brought into threaded engagement, the pipe 9 is pushed forward (to the right, Figure 1) by hand until its chamfered end 7 abuts against the inner conical surface 35. The tool is then squeezed tightly to firmly grip the pipe 9, substantially as indicated in Figure 4, and the nut 10 threaded onto connector 30, by applying a wrench to its planar surface 18. By referring to Figure 6 (showing the parts reversed with respect to Figure 4), it will be seen that the advancement of nut 10 to the right as it is being screwed onto the connector causes both the tool and the pipe to advance rightwardly. Considerable force is in this manner applied to the pipe to cause its chamfered end to enter the annular conical recess 33 of the connector, the wall of the pipe being spread outwardly by the inner conical surface 35 to form a flare 4.

During this forward movement of the pipe, the sleeve 20 is likewise moved forwardly by the nut 10. For this purpose the rear end portion 22 of the sleeve has an outer tapered surface 26 which is abutted by an internal conical surface 16 of nut 10, as shown in Figure 6, to cause the sleeve to move rightwardly as the nut is advanced in that direction. The pressure between surfaces 16 and 26 also causes a pressure between the sleeve 20 and the pipe, whereby the forward movement of the sleeve will materially assist in the forward movement of the pipe into recess 33. In addition, sleeve 20 has an annular projection or rib 25 which is abutted by annular shoulder 15 of nut 10, to provide a positive driving connection between nut 10 and sleeve 20 to supplement the frictional driving connection between tapered surfaces 16 and 26.

The forward end 23 of sleeve 20 has an inner tapered surface 24 so that an annular conical recess is provided between forward end 23 of the sleeve 20 and the pipe 9, for the flare 4 of the pipe, as shown in Figure 6. In this figure, which shows the coupling and pipe fully made up in a tight seat or joint, it will be noted that flare 4 and the forward, tapered end 23 of the sleeve are both received within the annular conical recess 33 (see Figure 1) of the connector 30 with the inner surface of flare 4 abutting the inner conical surface 35, with the outer surface of flare 4 and the inner tapered surface 24 of sleeve 20 in abutting relation, and with the outer cylindrical surface of the sleeve and the inner cylindrical surface 34 of the annular conical recess in abutting relation.

In making up the novel coupling joint, the special tool is held in one hand and a wrench applied by the other hand to the nut 10 to thread it onto connector 30, as already described. If necessary, connector 30 may be held in a vise or held by a wrench applied to its planar surface 38. To facilitate the manipulation of the special tool by one hand operation, the tool is designed so that its shanks 43, 43 need be spread apart a limited extent in applying it to the nut 10. That is, by reason of the limited opening of its shanks, it can be readily opened by the fingers of one hand. The tool may be applied to nut 10 when opened to this limited extent, by reason of the pivoting of its half shoes 46, 46. One of the vise shoes, the lower one in Figure 2, is turned outwardly, as shown, to enable the nut 10 to be received therein with its annular flange 17 seating in the arcuate groove 47 of the vise shoe. The shoe is then turned inwardly, or the tool itself turned relatively to the shoe, to bring the vises 46, 46 in closed relation, as shown in Figure 3. The opening of the tool is limited by the abutment of a flat surface 41', Figure 2, on the lever 41, near its pivotal point 42, with a flat surface 44' on the curved arm 44 of the other lever near the pivotal point 42. Only one of the vises or shoes 46, 46 need be pivotly mounted. However, it is more convenient to pivot both shoes so that the tool may be universally applied, i. e., from either side. It is more convenient that the lower shoe be turned outwardly (to receive the nut 10, as explained above) since that may be done with the aid of gravity.

The shoes 46, 46 are provided with a pair of apertured ears 48, 48 between which is received a central lug 49 projecting from the ends of the curved arms 44, 44 of the levers, which is likewise apertured to receive pivot pin or bolt 45. The end of central lug 49 is rounded at 49'

(Figure 2), and the vise shoe 46 is provided, between its said ears 48, 48, with a rounded cavity 46' for the round end 49' of central lug 49. The pin or bolt 45 does not fit tightly in the aligned apertures of space ears 48 and central lug 49, so that there is a limited extent of loose play. The purpose of this and the aforedescribed rounded end 49' of lug 49 and its reception in rounded cavity 46' of shoe 46, is to enable the pressure exerted by the levers to be conveyed by the central lugs 49, 49 directly to the vise shoes 46, 46, and not through the pivot bolt 45.

The vise shoes are removable at pivot bolt 45, so that different pairs of shoes may be interchangeably applied to the same tool for different size pipe. For example, one tool may accommodate vise shoes for pipe ranging from 1/8" to 1". For pipes larger than 1" the block tool shown in Figures 7 and 8 may be found more convenient. This comprises a pair of half blocks 56, 56, each of which has a semi-circular opening 59 to receive the pipe and a semi-circular annular groove 57 to receive the annular flange 17 of nut 10, Figure 1, which openings 59, 59 and grooves 57, 57 match to form a circular opening and an annular groove. The pipe opening is shown in Figures 7 and 8 as having threads 55 for gripping metal pipe, as explained above with special reference to Figure 5; where the block is to be used for soft metal or plastic pipe, rubber or leather facing strips would be used as described above in connection with strips 8, 8 of Figures 2-4. The two half blocks 56, 56 are held in matched relationship by dowel pins 51 on one block which fit in holes 52 in the other block. The two halves are held tightly together by a clamp 50 and the device is held against turning (during the threading of nut 10, as described above) by a handle 53, one end of which is threaded to be received in a selected one of a plurality of tapped holes 54 provided, for convenience, in one or both sides of the half blocks 56.

The form of my invention illustrated in Figures 9 to 22 is applicable to the joining of a pipe to a novel form of threadless coupling, such as the connector member 60 (see Figure 16) with its sleeve 61 which are to be joined to the pipe 62.

The tool 63 for effecting this joinder comprises the handle 64, the fixed jaw 65 attached thereto, the movable jaw 66 pivotally attached through pin 67 to the lug 68 extending from jaw 65, the releasable locking member 69, and two removable members, to wit, the split securing member or pusher 70, and the split curling or sealing member 71.

The stationary jaw 65 contains a transversely extending semi-cylindrical recess 72 which cooperates with a correspondingingly proportioned semi-cylindrical recess 73 in pivoted jaw 66 to form a cylindrical passageway 74 when jaw 66 is in its closed position. The said recessed portions contain, adjacent ends 75 and 76 thereof, respectively, the complementary semi-circular walls or ridges 77 and 78 which together form a retaining wall or collar 79 when the tool is in its closed condition. The said ends 75 and 76 combine to form what will hereinafter be referred to as the coupling end 80 of the tool; and the opposite ends 81 and 82 of said jaws combine to form what will hereinafter be referred to as the pipe end 83 of the tool. Extending inwardly from said ends 81 and 82 to a point short of said ridges 77 and 78 are the threaded portions 84 and 85, respectively, of the recesses 72 and 73, these threaded portions being coactive to form a continuous threaded portion 86 when said tool is in its closed operative condition.

The outer end 87 of the pivoted jaw 66 contains the slotted portion 88 proportioned to receive the lock bar 69 when the tool is closed, said bar being pivoted at 89. As is clearly shown in Figures 10 and 11, a nut 90 is mounted over the stud 91 extending from the bar 69, so that by tightening the nut 90 against upper surface 92 of pivoted jaw 66, the two coactive jaws are removably held in clamping engagement.

The push member 70 comprises the two interlocking semi-cylindrical halves 93 and 94 with internal semi-cylindrical walls 95 and 96 which cooperate to form a cylindrical pipe passageway 97 (Figures 19 and 20). In the form shown, the wrench-receiving portions 98 and 99 have, respectively, the ears 100 and recesses 101 to effect an interlocking engagement of said split sections 93 and 94. The forward portions of said sections have the semi-circular extensions or lips 102 and 103 which combine to form an annular pushing wall 104 having an outer cylindrical surface 105 and an inner conical surface 106 tapering forwardly and outwardly. The said surface 106 is proportioned for embracing engagement with the rear outer tapered surface 107 of the said sleeve 61. The outer surface of each of the pusher sections 93 and 94 is threaded to conform with the threaded portions 84 and 85 of the jaws, the threaded portions 108 and 109 being disposed forwardly of the wrench-receiving portions 98 and 99.

The said curling member 71 is constructed substantially like member 70 except for the said lip extensions 102 and 103. The wrench-receiving portions 110 and 111 are interlocking, the two separable sections 112 and 113 having coactive outer threaded portions 114 and 115, respectively, adapted for threaded engagement with threaded portions 84 and 85 of the tool jaws, the internal semi-cylindrical walls 116 and 117 cooperating to form a cylindrical pipe passageway 118 (Figure 21). The end of each of sections 114 and 115, however, each contains forwardly and outwardly tapered walls 119 and 120, respectively, which combine to form a conical curling wall 121 (Figure 21), proportioned for engagement with the rear edge 122 of the cylindrical shell 123 of connector member 60.

The said connector member 60 is analogous to the connector member 30 of the form of my invention first above described (Figure 1), having an annular recess 124 which corresponds to the annular recess 33, the said recess 124 having an inner conical surface 125 and a cylindrical outer surface 126. However, connector member 60 has no threaded portions, and is not adapted to receive thereon, as a permanent component thereof, a securing member like nut 10 of Figure 1. As will more clearly hereinafter appear, the shell 123 is adapted to be joined, by the tool and method of my invention, only to the sleeve 61 and pipe 62, to form a tightly sealed connection.

The shell 123 comprises not only the part containing the annular recess 124, but also the rear cylindrical portion 126 which is proportioned to house the sleeve 61 (see Figure 20). Between the foremost portion 127 and the shell 123 is the annular grooved portion 128 proportioned to receive therein the annular collar 79 of the jaws.

The sleeve 61 is substantially like the sleeve 20, the rear outer wall 107 being conical, as aforesaid, and the front inner wall 129 being also conical, as clearly indicated. The thickened portion 130 serves as an abutment rib, substantially like the annular rib 25 of sleeve 20 of the form first above described.

In the application of this form of my invention, the sleeve 61 is placed within shell 123 with the pipe 62 extending through the sleeve, the foremost portions of the sleeve and pipe being disposed at the entrance to recess 124. The pipe and coupling device in this preliminary assembled relation is placed within the lower stationary jaw 65, the annular ridge 77 extending into the grooved portion 128 of the connector member 60. The jaw 66 is then closed, the two jaws being locked into position by locking member 69, in the manner aforesaid. The separated sections 93 and 94 of pusher member 70 are placed over the pipe 62, an operation which may be done either when the jaws are still separated (Figure 17), or after they have been closed. When the split sections 93 and 94 are in engagement, they form a unitary member, which is rotatably manipulated to thread it into the threaded passageway 86 of the tool (Figures 18 and 19).

With the parts in this position, the handle 64 is grasped by one hand, and a wrench applied to the coacting wrench-receiving positions 98 and 99 of the pusher member 70. The operative turning of the pusher 70 will cause it to move forwardly towards the connector member 60 which is held against movement relative to the tool 63 by the latter's collar 79 extending into grooved portion 128. The continued forward movement of the pusher 70 brings the extension lip 104 thereof into embracing pressing engagement with the outer rear surface 107 of the sleeve. Because of the inclinations of the engaging wall 106 and 107 of the pusher member and sleeve, respectively, the actuating force of the pusher against the sleeve has both longitudinal and transverse components (relative to the pipe), thereby causing a slight deformation of the pipe, as indicated in Figure 20. Because of this pressing engagement between annular lip 104 of the pusher, the sleeve and the pipe, and the grip effected between the sleeve and pipe due to said slight deformation, the forward movement of the pusher member 70 causes a corresponding forward movement of the sleeve 61 and the pipe, the forward portions 131 of the lip and 132 of the pipe both entering the annular recess 124 of the connector member 60, as shown in Figure 20. Upon the completion of this operation, there is a firm and thoroughly sealed junction between the shell 123 of connector member 60, the sleeve 61 and the pipe 62.

At this point the pusher member 70 can be unscrewed, and then the two sections thereof simply separated from the pipe. Then, in the manner above described, the curling member 71 is placed over the pipe in assembled relation, and screwed as a unit into the threaded passageway 86 of the jaws until the conical surface 121 engages the end portion 122 of the shell 123. By the use of a wrench applied to portions 110 and 111, pressure is applied to said end portion 122 until it is curled inwardly, to seal that end of the union, as clearly shown in Figure 21, thereby completing the joining operation.

Thereafter locking member 69 is released and the jaw 66 swung open, permitting the pipe and coupling assembly to be lifted out, and the separable parts of member 71 removed.

Figure 22 illustrates a union similar to that of Figure 21, but showing the connector member 60a joined to two oppositely disposed pipes 62a and 62b. The sleeves 61a and 61b are shown in pressing engagement with said pipes 62a and 62b, respectively, and disposed within the shells 123a and 123b, respectively. With this construction, the single grooved portion 128a is adapted to receive the collar 79 of the tool as each side of connector member 60a is operatively disposed within the tool in the manner aforesaid.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claim.

I claim:

A tool for joining a pipe to a threadless coupling device containing a sleeve and a connector member with an annular transverse recess and an outer peripheral grooved portion, and wherein the sleeve is disposed over and in pressing engagement with the forward end of the pipe within said recess, comprising two separable co-acting jaws with matching semi-cylindrical recesses forming an open-ended passageway when the jaws are in operative engagement, said passageway being adapted for receiving therein the forward end of said pipe, said sleeve and the said annularly recessed portion of the connector member, a portion of said passageway being threaded, a hollow cylindrical member in threaded engagement with the threaded portion of said passageway and having a wrench-receiving portion, whereby it may be operatively rotated to advance it forwardly, the forward end of said cylindrical member having a forwardly protruding annular lip spaced inwardly and concentrically from the annular wall constituting said passageway, said lip being proportioned for entry within said connector member and for engagement with the rear of said sleeve during the operative forward advance of said cylindrical member, whereby the sleeve is compressed between said connector member and said lip to operatively deform the sleeve and the pipe end engaged thereby, the forward portion of the wall of said passageway having an annular ridge proportioned for interlocking engagement with said grooved portion of the connector member whereby the connector member may be held against substantial movement relative to the said pipe and sleeve.

References Cited in the file of this patent

UNITED STATES PATENTS

| | | |
|---|---|---|
| 793,209 | Miller | June 27, 1905 |
| 919,913 | Miller | Apr. 27, 1909 |
| 1,572,986 | Brewater | Feb. 16, 1926 |
| 1,641,895 | Merdian | Sept. 6, 1927 |
| 1,716,429 | Davies | June 11, 1929 |
| 1,994,210 | Chobert | Mar. 12, 1935 |
| 2,329,000 | Rembert | Sept. 7, 1943 |
| 2,355,871 | Kraft | Aug. 15, 1944 |
| 2,399,312 | Augustine | Apr. 30, 1946 |
| 2,466,057 | Somma | Apr. 5, 1949 |
| 2,466,317 | Kane | Apr. 5, 1949 |